Nov. 12, 1957        J. F. JOHNSON        2,813,134
RECOVERY OF CYCLODIENE MONOMERS
Filed Sept. 10, 1953
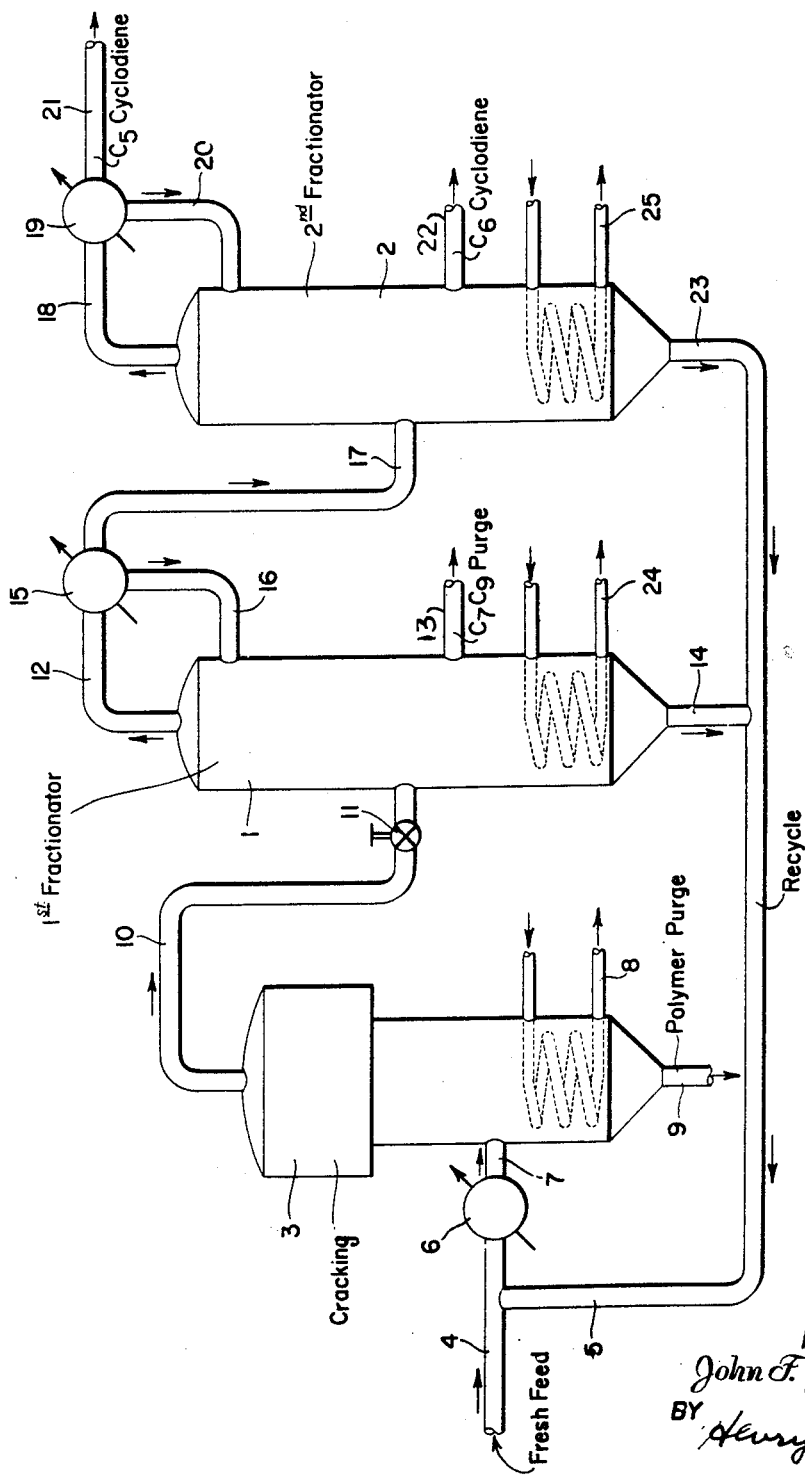
INVENTOR
John F. Johnson
BY Henry Berg
ATTORNEY

United States Patent Office 2,813,134
Patented Nov. 12, 1957

2,813,134

RECOVERY OF CYCLODIENE MONOMERS

John F. Johnson, Plainfield, N. J., assignor to Esso Research and Engineering Company, a corporation of Delaware Application September 10, 1953, Serial No. 379,357

3 Claims. (Cl. 260—666)

This invention relates to the recovery of cyclopentadiene and methyl cyclopentadiene in high purity from crude mixtures containing dimers and codimers of cyclopentadiene and methyl cyclopentadiene together with $C_7$ cyclopentadiene dimers and $C_8$–$C_9$ inert hydrocarbons.

It has now been demonstrated in accordance with the present invention that the recovery of the $C_5$ and $C_6$ cyclodienes is greatly improved by proper purging of the $C_7$ cyclodienes as monomers with the $C_8$–$C_9$ hydrocarbons as a vapor side stream in an intermediate fractionation of the crude vapor mixtures produced by cracking the feed prior to a further fractionation of the $C_5$ and $C_6$ components.

The formation of cyclopentadine monomer by cracking and its separation from the vapor product of cracking by fractionation is generally known. In general, such a process merely involves separation of the monomer from the heavier hydrocarbons by fractionation and refluxing of the heavier materials to the cracking zone. However, the recovery of both cyclopentadiene and methyl cyclopentadiene from mixtures containing their dimers together with $C_7$ cyclodiene dimers and $C_8$–$C_9$ hydrocarbons is more complicated. If the heavier materials, mentioned above, include substantial amounts of $C_7$ monomers and $C_8$–$C_9$ hydrocarbons and if these are not purged in an intermediate fractionation, they tend to build up in the cracker and recycle stream. This greatly increases the concentrations of $C_7$ cyclodiene monomers in the cracking zone and thereby increases formation of higher polymers and copolymers which recrack only slightly and therefore become essentially unrecoverable. The increased monomer concentration also reduces the rate of cracking. This makes it necessary to provide longer contact time which also increases the loss to the higher polymers.

In accordance with the present invention, it has been found important to remove the $C_7$–$C_9$ impurities, especially the $C_7$ cyclodienes, at a proper stage in the recovery process, preferably as a vapor side stream below the feed point in an initial or intermediate fractionation to obtain the desired maximum recovery of separated monomer products, each of high purity, and to reduce the investment required.

In the present process either vapor phase or liquid phase cracking or other type of cracking can be used to form the monomers from the cyclopentadiene dimer homologues in the feed. This invention is, however, particularly valuable in connection with the liquid phase cracking process. The improved means and fractionating operation used in conjunction with a liquid phase cracking is illustrated in the drawing.

Referring to the drawing, the principal equipment shown includes a first fractionator 1, a second fractionator 2, and cracking vessel 3. Fresh feed of the concentrated cyclodiene material is supplied by line 4 to vessel 3. Heavy recycle feed is supplied by line 5. Both the feed from line 4 and the recycle from line 5 are preheated in heat exchange vessel 6 to a temperature approaching the cracking temperature, e. g. of about 300° to 380° F. and are discharged by line 7 into the cracking and vapor separating vessel 3. The contents of the cracking vessel 3 are heated by any suitable means externally or internally of the vessel, such as the heating coil 8 to obtain a temperature inside the vessel of the order of 380° to 440° F., preferably at about 380° to 420° F. at pressures of about 0 to 14 p. s. i. g.

Residual liquid is withdrawn from the bottom of vessel 3 by line 9. The withdrawal rate of the liquid bottoms may be controlled to allow for any desired liquid holdup time, e. g. several minutes up to an hour or longer.

A vapor product stream is taken overhead from vessel 3 through line 10 which may be equipped with a pressure control valve 11. At the high temperatures used in the cracking vessel the vapors taken overhead through line 10 will include the $C_5$ through $C_{14}$ range hydrocarbon vapors. These vapors are passed into an intermediate part of the fractionating column 1. Fractionating column 1 is equipped with plates or fractionating means and is operated in such a manner as to take overhead principally the $C_5$ and $C_6$ monomer vapors by line 12. Vapor side stream line 13 for purging $C_7$–$C_9$ components is located in fractionator 1 below the inlet of feed line 10. The balance of residual heavy liquid material is withdrawn by bottoms line 14 and this material can be recycled back to the cracking vessel by line 5 since this material includes a substantial amount of $C_5$ and $C_6$ cyclodiene dimers.

The overhead $C_5$–$C_6$ monomer vapor stream from fractionator 1 furnishes reflux in the reflux condenser 15 for return to the upper part of fractionator 1 by line 16. The remainder of the fractionator $C_5$–$C_6$ monomer vapor stream is passed by line 17 into an intermediate part of fractionator 2 for separating the $C_5$ monomer from the $C_6$ monomer.

Fractionated $C_5$ monomer is taken overhead from fractionator 2 by line 18 to reflux condenser 19. Reflux is returned by line 20 to the upper part of column 2. The remaining $C_5$ cyclopentadiene product is withdrawn by line 21. $C_6$ monomer vapor is withdrawn as a side stream through line 22 below the feed inlet 17 of column 2. Residual hydrocarbon liquid containing dimers is withdrawn by line 23 and may be returned for recycling through line 5 to the cracking vessel 3.

Both fractionators 1 and 2 are provided with reboiler means 24 and 25, respectively.

Operating conditions used in satisfactory demonstration of the invention are summarized as follows:

The mixed dimer and codimer concentrates processed contained principally in dimerized form about 30 to 50% cyclopentadiene, 25 to 40% methyl cyclopentadiene, 5 to 10% acyclic dienes, 5 to 10% $C_7$ cyclodienes, and the balance of the material was composed of acyclic hydrocarbons and other impurities in the $C_8$ and higher range.

The cracking conditions and operating temperatures controlled in the fractionators were in the ranges shown in the following table:

TABLE I

[Cracker 3: liquid 332–440° F.; vapor 395–450° F.; pressure 0–14 p. s. i. g.]

| Temperatures, ° F. | 1st Fractionator (1) | 2nd Fractionator (2) |
|---|---|---|
| Overhead Vapor | 120–160 | 103–116 |
| Feed | 200–300 | 117–120 |
| Side Stream Vapor | 265–285 | 150–170 |
| Bottoms Liquid | 310–340 | 340–365 |

Suitable cracking rates with low formation of $C_5$ acyclic diene monomers occurred at cracking temperatures of 382° F. to 420° F. At about 440° F. the $C_5$ acyclic diene monomer increases excessively.

In the first fractionator the temperatures were controlled by regulation of the reflux ratios at the top, e. g. about 2/1 to 3/1, heat input in the bottom reboiler and rates of removing overhead product, side stream purge and bottoms product. The desired overhead product of the first fractionator is removed at a temperature of 120° to 160° F. at about 1 atmosphere pressure. The desired removal of the $C_7$–$C_9$ side stream purge in the first fractionator 1 is obtained where the vapor temperature in the fractionator is in the range of about 265° to 285° F., and this required a reboiling or bottoms temperatures in the range of 310° to 340° F. Said purge stream containing $C_7$ to $C_9$ hydrocarbons amounted to about 5 to 10% of the fresh feed to the cracker. It contained a small amount of $C_5$ and $C_6$ components with the $C_7$ to $C_9$ components.

The temperatures are controlled in the second fractionator 2 by the reflux ratio of about 3/1 to 1/2, the reboiler temperature, and removal rates for overhead, side stream and bottoms. Satisfactory cyclopentadiene overhead product of 95+% purity is obtained when the overhead temperature is of the order of 103° to 106° F. at about 1.0 atmosphere pressure.

A satisfactory methyl cyclopentadiene or $C_6$ side stream of above 95% purity is withdrawn at a point where the vapor temperature is in the range of 160° F. to 170° F., while the bottoms temperature is maintained in the second fractionator at 340° to 360° F. The $C_6$ purity of the side stream also depends on the rate of withdrawal, since a decrease in the drawoff rate increases the $C_6$ purity without substantially affecting the $C_5$ purity of the overhead product. The $C_6$ side stream drawoff rate may amount to 50% to 100% of the overhead rate in the second fractionator depending on the relative $C_6$ content of the feed.

The purging of the $C_7$–$C_9$ impurities to prevent these impurities from entering the final fractionator and to prevent them from being recycled back to the cracking zone is very important in obtaining the desired high purity and high recovery of $C_5$ and $C_6$ monomer products.

With no purging of the $C_7$ impurities from the monomer vapor stream prior to separation of the $C_6$ from the $C_5$ cyclodienes or with inadequate purging of the $C_7$ impurities, the $C_6$ product is greatly lowered in purity. In accordance with this invention the maximum amount possible of $C_7$ cyclodiene monomers and $C_8$–$C_9$ hydrocarbons are removed in the vapor side stream of fractionator 1.

It should be noted, however, that the $C_7$ cyclodienes are the key impurities on the proper removal of which depends the success or failure of the process. This will be fully appreciated when it is realized that these $C_7$ cyclodienes cannot be removed from the feed by distillation since they are there present as dimers and codimers, boiling in the same range as the $C_5$ and $C_6$ cyclodiene dimers and codimers. The presence of these impurities in the recycled streams increases the holdup and the monomer concentrations in the cracking zone, and thus increases the rate of high polymer formation. Their presence also increases the amount of fractionating equipment required for making a separation of the desired $C_5$ and $C_6$ cyclodiene monomers from the heavier components. In accordance with the present invention the $C_7$ cyclodiene monomer is therefore removed advantageously as an intermediate fraction from the cracking zone vapors and prior to the final separation of the $C_5$ and $C_6$ cyclodienes.

If the fresh mixed dimer and codimer feed is subjected to cracking in the vapor phase, e. g., at temperatures of 600° to 900° F., instead of the liquid phase, losses by polymer formation might not be as serious. However, the method of the present invention nevertheless reduces fractionating requirements and gives improved recovery of higher quality products with vapor phase cracked dimer concentrates.

The following are examples of the use of the processes of the present invention to obtain improved yields and quality of $C_5$ and $C_6$ cyclodiene products.

Example 1

One part by weight of the fresh dimer concentrate feed was charged with at least 4 parts by weight of recycled dimer concentrate from the fractionator bottoms. The cracking was carried out at temperatures in the range of 400° to 440° F. at pressures in the range of from 1 to 2 atmospheres.

The vapors from the cracking zone were cooled but maintained at temperatures in the range of 235° to 260° F. on being fed into the first fractionator. The top reflux ratio was maintained at from 2 to 1 to 5 to 1 to have an overhead vapor temperature of 144° to 153° F. with a reboiler temperature of 320° to 330° F. in the first fractionator.

The first fractionator sidestream was taken where the temperature was 265° F. to 275° F. and amounted to 8% to 12% by weight of the fresh feed. The sidestream contained only 25% to 35% of $C_7$ cyclodienes and other $C_7$ to $C_9$ hydrocarbons. The yields of $C_5$ and $C_6$ cyclodienes were correspondingly low, being only 68.8 wt. percent and 56 wt. percent, respectively, based on the fresh feed.

Example 2

All of the conditions were the same as for Example 1 except that the first fractionator sidestream contained 65% to 75% of $C_7$ cyclodienes and other $C_7$ to $C_9$ hydrocarbons. The improved purging of these impurities in the sidestream resulted in improved yields of the desired products. The yield of $C_5$ cyclodiene was 79 wt. percent and that of $C_6$ cyclodiene was 67 wt. percent based on fresh feed.

It should be noted that for Examples 1 and 2, the purities of the products were essentially the same. It is realized that some of the $C_7$ to $C_9$ impurities can be purged by removing them overhead from the first fractionator together with the $C_5$ and $C_6$ cyclodienes. This is highly undesirable, however, since they must then eventually be removed with the $C_6$ product and result in a low $C_6$ purity.

Having described the invention it is claimed as follows:

1. In a process of recovering separate $C_5$ and $C_6$ cyclodiene fractions from a vapor mixture containing said cyclodienes with $C_7$ cyclodienes and other $C_7$–$C_9$ hydrocarbon impurities as a result of cracking a dimer concentrate in a cracking zone, the improvement which comprises first fractionating the vapor mixture in a fractionating zone wherein an intermediate sidestream fraction of $C_7$–$C_9$ impurities is removed, taking overhead from said first fractionating zone $C_5$ and $C_6$ cyclodienes freed of $C_7$ and higher components, withdrawing a bottoms fraction containing cyclodiene dimers, further fractionating the overhead of $C_5$ and $C_6$ cyclodienes from the first fractionating zone in a second fractionating zone, withdrawing a side stream of $C_6$ cyclodienes from said second fractionating zone, withdrawing an overhead of $C_5$ cyclodiene from said second fractionation zone, withdrawing a bottoms fraction of $C_5$ and $C_6$ cyclodiene dimers from the second fractionating zone, and recycling to the cracking zone $C_5$ and $C_6$ cyclodiene dimer-containing bottoms fractions from said fractionating zones, said bottoms fractions being thus freed of the $C_7$ cyclodienes.

2. In a process of recovering separate $C_5$ and $C_6$ cyclodiene fractions from a vapor mixture thereof containing $C_7$ cyclodienes, the improvement which comprises fractionating the vapor mixture in a fractionating zone to remove an overhead distillate fraction containing the $C_5$ and $C_6$ cyclodienes substantially free of $C_7$ cyclodienes while forming a bottoms product containing liquid dimers of the $C_5$ and $C_6$ cyclodienes, heating said bottoms product to an elevated temperature to strip $C_7$ cyclodienes therefrom, fractionating the stripped $C_7$ cyclodienes to obtain an intermediate fraction in which the $C_7$ cyclodienes are concentrated, separating the intermediate fraction of $C_7$ cyclodienes, recracking the $C_5$ and $C_6$ cyclodiene dimers in the bottoms fraction in liquid phase at a temperature between about 380° and 440° F. and a pressure of about 0 to 14 p. s. i. g. to form a vapor mixture containing $C_5$ and $C_6$ cyclodienes, and fractionating this vapor mixture as described.

3. In a process of recovering separate $C_5$ and $C_6$ cyclodiene fractions forming a vapor mixture thereof with $C_7$ cyclodienes and other $C_7$–$C_9$ hydrocarbon impurities, the improvement which comprises feeding the vapor mixture at a temperature in the range of 180° to 300° F. into a fractionating zone, fractionating vapors above the feed point of said fractionating zone to take overhead the $C_5$ and $C_6$ cyclodienes substantially free of $C_7$ cyclodienes at vapor temperatures in the range of 120° to 160° F., heating the residual liquid portion of the hydrocarbons to a temperature in the range of 320° to 340° F. to strip therefrom $C_7$ to $C_9$ hydrocarbons including the $C_7$ cyclodienes purging the stripped $C_7$ to $C_9$ hydrocarbons from the process by removing an intermediate fraction having a vapor temperature in the range of 265° to 285° F. from said fractionation zone below the feed point of the aforesaid vapor mixture, and thereafter cracking the stripped residual bottoms in liquid phase at a temperature between about 380° and 420° F. and a pressure of about 0 to 14 p. s. i. g. to obtain additional $C_5$ and $C_6$ cyclodienes to be fractionated.

References Cited in the file of this patent

UNITED STATES PATENTS

| | | |
|---|---|---|
| 2,387,993 | Hepp | Oct. 30, 1945 |
| 2,636,056 | Jones | Apr. 21, 1953 |
| 2,733,279 | Wilson et al. | Jan. 31, 1956 |
| 2,735,875 | Hubbard et al. | Feb. 21, 1956 |
| 2,751,422 | Nelson et al. | June 19, 1956 |